July 7, 1925.  
G. F. NALDER  
WHEELBARROW  
Filed March 14, 1925  
1,544,769
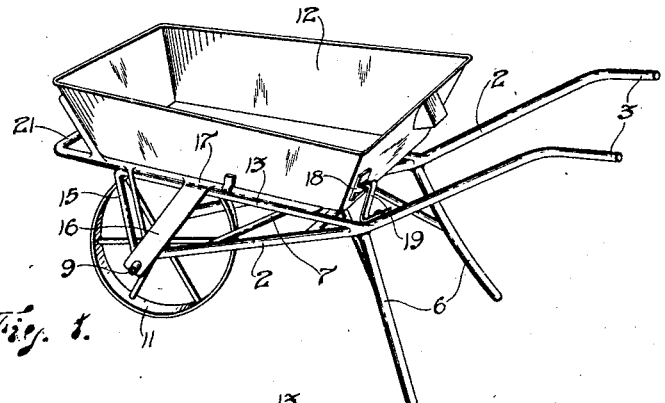
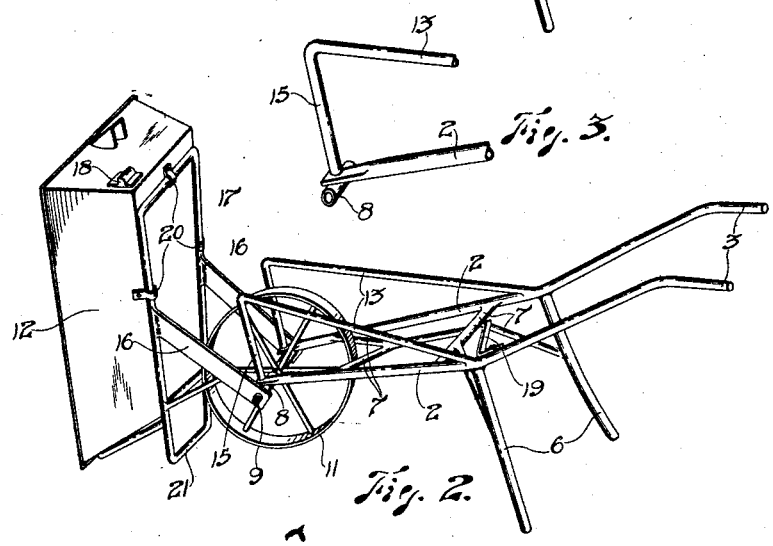
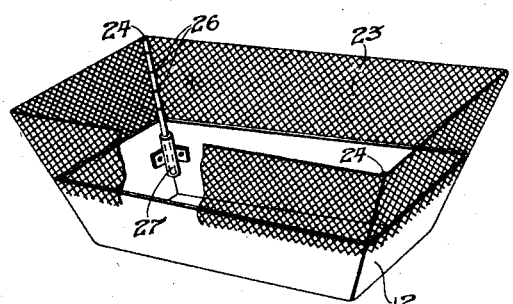
Inventor  
G. F. Nalder Patented July 7, 1925.

1,544,769

UNITED STATES PATENT OFFICE.

GEORGE FREDERICK NALDER, OF CASTLEMAINE, VICTORIA, AUSTRALIA.

WHEELBARROW.

Application filed March 14, 1925. Serial No. 15,617.

*To all whom it may concern:*

Be it known that I, GEORGE FREDERICK NALDER, a subject of the King of Great Britain and Ireland, residing at Castlemaine, in the county of Talbot, State of Victoria, Commonwealth of Australia, have invented certain new and useful Improvements in and Relating to Wheelbarrows, of which the following is a specification.

Wheel-barrows as at present in common use are possessed of two distinct disadvantages firstly, that the weight of the load cannot be evenly balanced but is taken by the arms of the operator and secondly, that to discharge the load it is necessary to turn the barrow completely upside down in a forward direction or deposit the load from the side of the barrow. It is difficult in either case to deposit the load in the exact position desired by the operator.

The primary object of the present invention is to overcome the above mentioned disadvantages by the provision of an improved wheel-barrow preferably of all metal construction wherein the load receptacle or tray is so arranged in relation to the supporting wheel and axle that the operator is relieved of a considerable part of the weight and in which the load receptacle may be readily tilted or tipped independently of its supporting frame to facilitate discharging the contents of the receptacle.

The invention will however be fully explained in the following description and defined in the appended claims.

Referring to the drawings which form part of this specification:—

Figure 1 is a perspective view of a wheelbarrow constructed in accordance with the invention.

Figure 2 is a view similar to Figure 1 but shows the load receptacle of the barrow tipped to discharge its load.

Figure 3 is a fragmentary detail view showing a member of the wheel barrow frame which carries a bearing for the wheel axle.

Figure 4 is a perspective view showing a removable upstanding extension applied to the barrow receptacle to increase its carrying capacity.

A wheel barrow in accordance with the present invention includes a main framework which may comprise longitudinal side members 2 which preferably extend downwardly and forwardly as shown, the rear portions 3 of said side members being adapted to serve as handles. Supporting legs 6 depend from the side members 2 and suitable stays 7 may be provided between the side members and beneath the load receptacle to brace the said legs 6 and side members 2 and impart the desired rigidity and strength to the framework.

The said main framework is preferably constructed of metal tubing as shown, the various tubular frame members being united at their intersections by welding, brazing or like means.

Tubular sleeves or bearings 8 may be clamped or welded to the forward ends of the downwardly and forwardly inclined longitudinal side members 2 as seen in Figure 3 to receive the axle 9 upon which the supporting wheel 11 is mounted. This wheel 11 may be of somewhat larger diameter than the wheels usually provided on wheel-barrows. The said tubular sleeves or bearings may extend sidewardly outwards from the framework for reasons hereinafter apparent.

The load receptacle or tray 12 is adapted to swing or tip about a lateral axis as hereinafter described and when in its normal position is disposed directly over the wheel 11 and its axle 9 and rests upon longitudinal supporting members 13 which are secured to the longitudinal side members 2 of the main framework and are disposed in a substantially horizontal plane so that they diverge forwardly from said side members 2 above the latter. The forward ends of the supporting members 13 are connected to the members 2 by downwardly extending portions 15 thereby forming a substantially triangular frame structure as shown.

By thus resting the load receptacle or body on the supports 13 at some distance above the axle 9 so that the wheel 11 is disposed directly beneath the load receptacle with the front of the latter projecting forwardly over the axle the weight of the load is removed to a large extent from the operator and taken more directly by the wheel than in existing barrows where the wheel and its axle are disposed in advance of the body or receptacle and the load consequently acts as a dead weight between the wheel and the hands of the operator.

To provide for the tipping of the load receptacle 12, arms or droppers 16 may depend from each side of the receptacle 12 or from a tipping frame 17 which is also preferably constructed of metal tubing, and to which said receptacle may be attached as at 20 preferably by detachable fastening devices whereby the receptacle 12 may be interchanged for a different body or receptacle such for instance as a water containing vessel.

The lower ends of the droppers 16 are adapted to turn about a lateral pivotal axis which may be furnished by the outstanding side portions of the aforesaid tubular sleeves for bearings 8 the balance of the load receptacle being arranged in favor of its rear in order to avoid inadvertent tipping of the receptacle from its normal position as in Figure 1.

The tipping body or receptacle 12 may be retained in its normal position by a suitable spring catch or retainer one member 18 thereof being mounted on the receptacle and another interengaging member 19 carried by one of the frame members.

A suitable limit stop which may consist of a forward extension 21 of the tipping frame 17, is preferably provided to engage the ground when the receptacle is swung forwardly about its pivotal axis thereby limiting the tipping movement.

To deposit the load from the barrow it is merely necessary to release the aforesaid fastening device and raise the handles 3 slightly whereupon the receptacle 12 tips forwardly as seen in Figure 2 so that the load may be completely discharged therefrom into the desired position. The receptacle 12 may be swung back by hand into its normal position as seen in Figure 1 or the handles may be raised until the members 18 and 19 of the catch device engage each other, the handles being then depressed so that the receptacle is returned to its normal position ready for further use.

In certain instances especially when transporting relatively light materials the carrying capacity of the load receptacle 12 may be increased by fitting a detachable upstanding extension or fence to the sides or walls of the receptacle. As seen in Figure 4 such extension may include a length of wire netting 23 to which a number of supporting rods 24 are suitably attached as indicated at 26 the lower ends of these rods being removably accommodated by sockets or the like 27 attached to the receptacle sides at each corner thereof.

A wheel barrow constructed in accordance with the present invention combines lightness with extreme strength and durability and may be used with much less fatigue and more easily discharged than the conventional type of wheel barrow.

Having now described my invention what I claim as new and desire to secure by Letters Patent is:—

1. A wheel barrow having a supporting frame provided at one end with legs, a ground wheel mounted in said frame at the opposite end, a tipping frame pivotally connected with the supporting frame in line with the axis of the wheel, and a body carried by the tipping frame, said tipping frame being extended in advance of the body.

2. A wheeel barrow having a supporting frame, a ground wheel mounted in one end of said frame, a tipping frame adapted to overlie and rest upon the supporting frame, arms depending from the tipping frame and extending downwardly and forwardly to the axle of the ground wheel, and a body secured upon the tipping frame, said tipping frame having a portion projecting upwardly in front of the body and a portion projecting in the plane of the tipping frame beyond the forward end of the body.

In testimony whereof I affix my signature.

GEORGE FREDERICK NALDER.

Witness:
ORETON J. KELSON.